United States Patent [19]

Addeo

[11] 4,025,853
[45] May 24, 1977

[54] METHOD AND APPARATUS FOR RADIO SYSTEM COCHANNEL INTERFERENCE SUPPRESSION

[75] Inventor: Eric John Addeo, Long Valley, N.J.

[73] Assignee: Bell Telephone Laboratories, Incorporated, Murray Hill, N.J.

[22] Filed: Feb. 12, 1976

[21] Appl. No.: 657,564

[52] U.S. Cl. .................................. 325/55; 325/64; 325/466; 325/478; 343/177

[51] Int. Cl.² ...................... H04B 3/60; H04B 15/00

[58] Field of Search ........................... 325/51–53, 325/55, 64, 54, 466, 478; 343/177, 200, 205; 179/41 A; 340/311–313

[56] References Cited

UNITED STATES PATENTS

| | | | |
|---|---|---|---|
| 2,904,674 | 9/1959 | Crawford | 325/52 |
| 2,987,586 | 6/1961 | Berger | 179/175.3 |
| 3,437,937 | 4/1969 | Warfield | 325/478 |
| 3,728,634 | 4/1973 | Watkinson | 325/478 |
| 3,733,554 | 5/1973 | Wycoff et al. | 325/478 |
| 3,746,991 | 7/1973 | Gautney | 325/55 |
| 3,763,324 | 10/1973 | Garcia et al. | 325/64 |
| 3,806,664 | 4/1974 | Bowen et al. | 179/84 |
| 3,866,124 | 2/1975 | Wycoff | 325/64 |
| 3,895,191 | 7/1975 | Koganezawa et al. | 179/15 |
| 3,909,727 | 9/1975 | Hughes et al. | 325/478 |

OTHER PUBLICATIONS

High Capacity Mobile Telephone System Technical Report (Filed in F.C.C. Docket 18262) Dec. 1971 – Prepared by Bell Laboratories, pp. 3–11 – 3–13, 3–22 – 3–28.

Primary Examiner—Robert L. Griffin
Assistant Examiner—Marc E. Bookbinder
Attorney, Agent, or Firm—Charles Scott Phelan

[57] ABSTRACT

In a radio communication system of the cellular type wherein sets of communication channels are reused in different adjacent sets of cell areas within a common mobile communication service area, each cell base station utilizing a given set of channels in common with other base stations is assigned a different supervisory tone to be modulated on all of its channels. Any mobile unit receiving such channel transponds the modulated supervisory tone and sends it back to the base station. At each base station the transmitted and received supervisory tones for any given channel are compared to produce an indication of whether or not the sending mobile unit is actually communicating on the transmitted channel of the same base station. At each mobile unit, reference tones are generated which are spectrally located between adjacent ones of the possible supervisory tones for the mobile communication area, and the spectral position of a received tone with respect to the reference tones is determined. Signals representing that determination are translated into a digital character corresponding to the name of the received tone, and that name is compared with the name of the tone for the mobile unit's assigned channel. A name mismatch is utilized to quiet the mobile unit receiver for the duration of the mismatch. In addition, if that duration exceeds a predetermined interval, the mobile unit controller is actuated to initiate the dropping of communication on the assigned channel.

12 Claims, 4 Drawing Figures

D/R = 4.6
N = 7 SETS

METHOD AND APPARATUS FOR RADIO SYSTEM COCHANNEL INTERFERENCE SUPPRESSION

BACKGROUND OF THE INVENTION

1. Field of the Invention

This invention relates to a cellular radio communication system; and it relates, in particular, to arrangements for detecting and responding to cochannel interference with respect to equipment in cells utilizing a common channel.

2. Description of the Prior Art

Cellular radio communication systems are being increasingly considered as arrangements which can allow substantially higher numbers of mobile radiotelephone subscribers to have access to a relatively limited number of radio communication channels. One form of such a cellular system is described in a book, *High Capacity Mobile Telephone System Technical Report*, Dec. 1971, prepared by Bell Laboratories, filed with the Federal Communications Commission in that month under Docket 18262, and copies of which can be purchased from Downtown Copy Center, 1730 K Street, N.W.; Washington, D.C. 20006. It has been proposed in such a cellular radio system to require each base station, sometimes called a cell site, which communicates on a set of channels in common with other base stations that are within a potential cochannel interference radius, to modulate onto its access, or call set-up, channel signals a supervisory tone which is unique to that base station among the group of possibly interfering base stations. Such a tone is transponded by each mobile unit receiving that channel. Any base station receiving the retransmitted tone employs it to determine whether or not the transponding mobile station has been captured by an interfering base station and whether or not the receiving base station has captured an interfering mobile station. However, supervisory tones have not been used for dealing with cochannel interference on voice channels, as distinguished from access channels; and specific circuits for accomplishing supervisory tone verification have not heretofore been available. Likewise, arrangements have not heretofore been available for utilizing such tones in a mobile unit for detecting and responding to cochannel interference.

SUMMARY OF THE INVENTION

In an embodiment of the present invention the stronger of two receptions of the same channel at a given station is selected and its supervisory tone is compared with a locally generated reference tone. A digital signal is produced which indicates the relative spectral positions of the selected tone and the reference tone, and that signal is utilized to determine whether or not the selected tone is the supervisory tone of the communication channel currently assigned for use by the station.

In one embodiment detection of a tone mismatch for a predetermined minimum time initiates termination of radiotelephone communication by the station on that assigned channel. In addition in a mobile station the receiver audio output is inhibited for the duration of the mismatch.

In another embodiment, the output of the tone comparison is employed to generate a voltage having a magnitude that is a function of the frequency difference between the tones. If that voltage remains above a certain threshold for the minimum time, call termination is initiated.

BRIEF DESCRIPTION OF THE DRAWING

A more complete understanding of the invention and its various features, objects, and advantages may be obtained from a consideration of the following detailed description in connection with the appended claims and the attached drawing in which:

DETAILED DESCRIPTION

Figure 1:
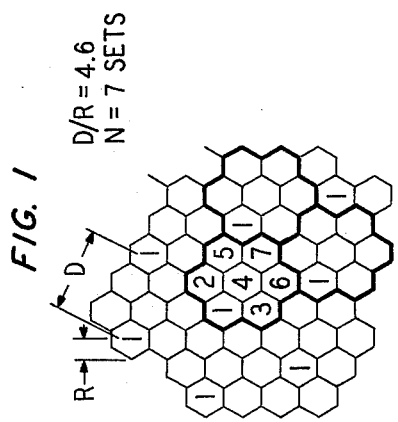
FIG. 1 is a diagram of cells and channel assignments indicating channel reuse in a previously proposed cellular radiotelephone communication system.

FIG. 1 illustrates a part of a honeycomb type of cellular overlay on a mobile communication area for defining approximately the principal communication subareas associated with respective sets of radio frequency channels. Although the term "mobile" often connotes a motor-vehicle-mounted unit, the term is not so restricted and can embrace any portable radio station.

In the center of the honeycomb arrangement of hexagonal cells in FIG. 1 is a set of seven cells numbered 1 through 7. Each of those seven cells is assigned a different set of communication channels. For present purposes it is immaterial whether each cell has a centrally located omnidirectional antenna system or each cell has a directional antenna system with antennas located, for example, at respective alternate corners of each hexagonal cell representation.

Surrounding the central set of cells in FIG. 1 is a ring of six further cell sets, each having the same overall channel set as does the aforementioned central cell set, although only the upper left-hand cell in each set of the ring is numbered with the No. 1 to facilitate cell set location. Additional cell sets can be added in any direction as may become necessary to suit the needs of the radiotelephone traffic to be handled. It has been found that there usually is no significant cochannel interference between cells using the same set of channels because cells in which a common channel set is reused are not closer to one another than a distance of D units, approximating the diameter of a cell set, for a cell radius of R units, and wherein the ratio D/R equals approximately 4.6 for the seven-cell hexogonal grid of FIG. 1. Stated differently, the cells are advantageously proportioned and operated so that a signal-to-interference ratio of at least 17 dB prevails over at least 90% of the cell area. Such a ratio allows the frequency modulation capture effect to suppress an otherwise interferring signal.

Of course, various events can cause signal fades or surges that can result in cochannel interference. Thus, Rayleigh fading, produced as a mobile station is moved, can cause brief bursts of such interference. Also, shadow effects caused by a mobile station passing behind, with respect to its base station, some topological formation such as a hill or a building can also cause fading. In addition, the peaking effect produced by a mobile station passing over the top of a high hill can produce a signal surge of significant duration. It has been found that higher channel utilization results if cell patterns need not be so large as to prevent all cochannel interference in spite of the aforementioned signal fading and surging types of occurrences.

Figure 2:
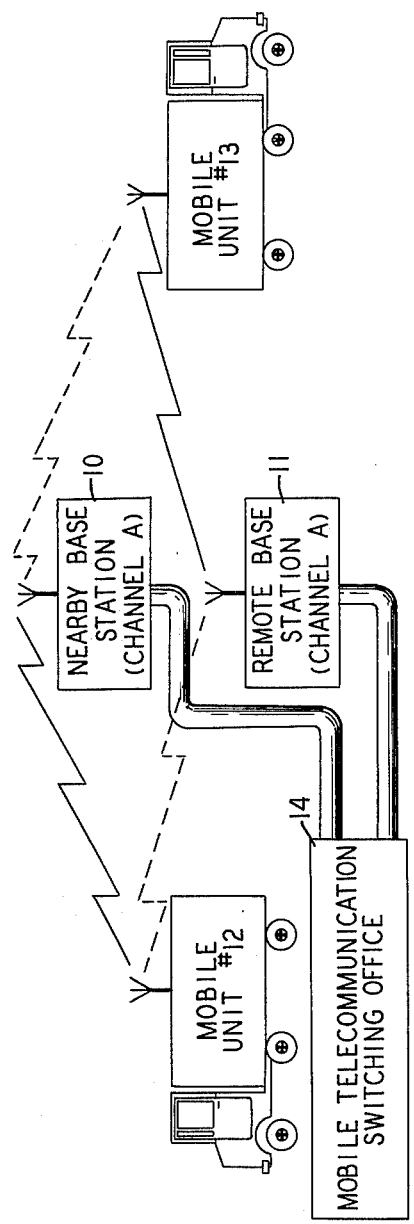
FIG. 2 is a simplified functional diagram indicating potential cochannel interference paths among radiotelephone units.

In FIG. 2 there are shown two base stations: a nearby station 10 and a remote base station 11 which are both utilizing the same communication channel as schematically represented in the block in the drawing by the term "Channel A" for each base station. A mobile telecommunication switching office (MTSO) 14 is connected to each base station by a separate circuit for each channel at that station. These two base stations are assumed to be a distance D apart in different cell sets as hereinbefore indicated with respect to FIG. 1. Accordingly, although both stations are utilizing the same communication channel, each has a different supervisory audible tone (SAT) modulated on its respective transmissions in that channel.

Also shown in FIG. 2 are two mobile units 12 and 13 which are located in the cells of, and for primary communication with, the base stations 10 and 11, respectively, as schematically represented by the solid jagged lines extending between antennas. However, due to some signal fading or surging phenomena, such as those of the type hereinbefore mentioned, the mobile units 12 and 13 may also find themselves in at least limited communication with the base stations 11 and 10, respectively, as indicated by the broken jagged lines extending between the antennas of unit 12 and station 11 and between the antennas of unit 13 and station 10.

For example, a signal fading condition of some kind may cause the mobile unit No. 12 to capture transmission from the base station 11 instead of that on the same channel from the base station 10 even though the mobile unit No. 12 is still being adequately heard by the base station 10. In the latter circumstance, the mobile unit No. 12 will transpond the SAT of base station 11 and the nearby base station 10 will detect the lack of SAT verification in the transmission from mobile unit 12. Alternatively, the aformentioned fading condition with respect to mobile unit No. 12 may not result in its capture of the remote base station transmission 11, but it may enable the nearby base station 10 to capture transmissions from the mobile unit 13 even though the latter unit is still being adequately received by the remote base station 11. Here again, the nearby base station 10 would also detect a lack of SAT verification on its channel A.

The cochannel interference indicated by the lack of SAT verification in a station can indicate the presence of conditions which result in annoyance to radio telephone subscribers during short interference bursts. In addition, if the lack of SAT verification continues long enough a loss of supervision may result.

Figure 3:
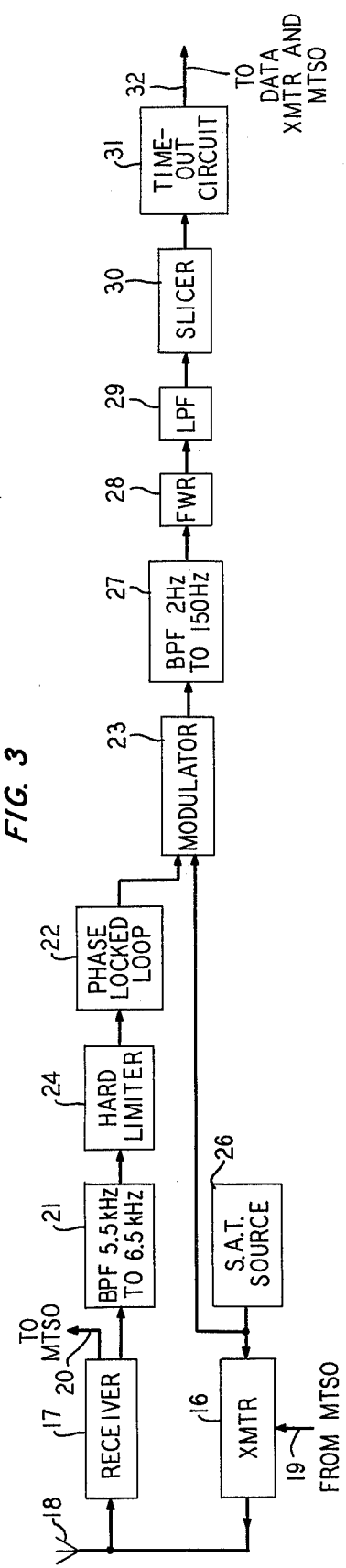
FIG. 3 is a simplified block and line diagram of cell base station equipment for utilizing supervisory tones to detect cochannel interference.

FIG. 3 illustrates in block and line diagram form one embodiment of base station circuits for detecting improper SAT in a received signal and acting upon the detected information. In these circuits a transmitter 16 and a receiver 17 for some communication channel, such as the channel A noted in connection with FIG. 2, are both served by an antenna 18. The transmitter also receives voice communication signals on a circuit 19 extending from MTSO 14; and in similar fashion, the receiver 17 sends voice signals on a circuit 20 to the MTSO 14. Within the base station of FIG. 3 a bandpass filter 21 receives the signals from the receiver output circuit 20 and extracts therefrom signals in a narrow frequency band including all SATs for base stations within the high capacity mobile telecommunication system and excluding frequencies in the normal voiceband. For example, in a system utilizing SATs having frequencies in the range of 6 kHz, there are seven potentially interfering cells, e.g., the cell No. 1 in the central set and the six surrounding cell sets of FIG. 1. For such an arrangement, a passband of approximately 5.5 kHz to 6.5 kHz is sufficient for the filter 21. This assumes that the various SATs are approximately 30 Hz apart, i.e., about 0.5 percent of the frequency of one tone is provided for spacing between adjacent tones. It is advantageous to have the SATs close to one another and relatively close to the voiceband since the amount of noise energy increases rapidly with increasing frequency. Also SAT frequencies around 6 kHz are convenient for use in phase ranging to locate a mobile unit.

Signals in the SAT band from the filter 21 are squared up in a hard limiter 24 prior to application to a narrowband phase-locked loop 22. Output of loop 22 is coupled to one input of a product modulator 23. The phase-locked loop locks to the SAT, or the average of plural SATs, that may be present in the output of filter 21. Such a selection is necessary because when some effect causes two signals on the same channel from different sources to be close to the same level, the capture effect is not operative. One suitable product modulator is the Motorola Corporation MC4044 phase-frequency detector.

In one embodiment of the FIG. 3 circuits the phase-locked loop 22 was constructed using voltage controlled oscillator circuits of the type shown in "A Highly-Stable VCO for Application on Monolithic Phase-Locked Loops" by R. R. Cordell and W. G. Garrett and appearing in pages 200, 201 and 235 of Digest of Technical Papers, 1975 IEEE International Solid State Circuits Conference. A phase comparator shown by Cordell et al was connected to be responsive to the outputs of limiter 24 herein and of the VCO in that paper to supply a phase error signal to that VCO, which in turn had its output supplied to an input of modulator 23 herein. As directed in that paper, external impedances were applied to fix the gain of the phase comparator and the VCO and to fix the frequency range and center frequency of the VCO.

A SAT signal source 26 provides the SAT which is assigned to the illustrated base station for use on its channels. Output from the source 26 is applied to the transmitter 16 for modulation, usually frequency modulation, onto the transmitted carrier frequency of the channel along with the voice signals from the circuit 19. In addition, the output of source 26 is also applied to another input of the modulator 23 as a reference frequency.

The output of modulator 23 is passed through another active bandpass filter 27 which selects the band of difference frequencies in the modulator output. For the illustrative embodiment herein described, filter 27 has a passband extending approximately from 2 to 150 Hz. This passband includes the maximum frequency difference which might occur between the lowest frequency and the highest frequency of the three SATs that could be involved, and it also includes the smallest difference that could occur as the average of plural SATs. The output of filter 27 is passed through a full-wave rectifer 28 and a low-pass filter 29 for producing a direct current level signal having an amplitude corresponding to the magnitude of the frequency difference between the SAT captured by the phase-locked loop 22 and the SAT provided by source 26.

The direct-current signal from filter 29 is applied through a slicer 30 which provides to a time-out circuit 31 a binary ONE signal if the direct-current level is at least large enough to represent the difference frequency between the signal from source 26 and the average frequency of two adjacent SATs. Otherwise the slicer output to circuit 31 is a binary ZERO. That is, the output of slicer 30 is a digital signal indicating the relative spectral positions of the reference and received SATs, i.e., indicating whether or not they are at substantially the same frequency.

The time-out circuit 31 produces a drop-call signal in response to the continuous persistence of a binary ONE signal as its input for a predetermined interval, such as 5 seconds. This drop-call signal is applied on a circuit 32 to initiate interruption of the direct current voice communication loop between the cell site and the MTSO 14. Upon recognizing loss of d-c loop supervision, the MTSO returns data signals to the base station that cause it to turn off its transmitter 16 and receiver 17, thereby terminating the call connection involved. If the mobile station which had been involved in the call is still able to receive from the base station of FIG. 3, it will sense the loss of carrier transmission from the base station and initiate retuning of its own transmitter and receiver to the strongest paging channel which it can receive in order to initiate establishment of any further communication. However, these latter aspects of system operation comprise no part of the present invention.

Figure 4:
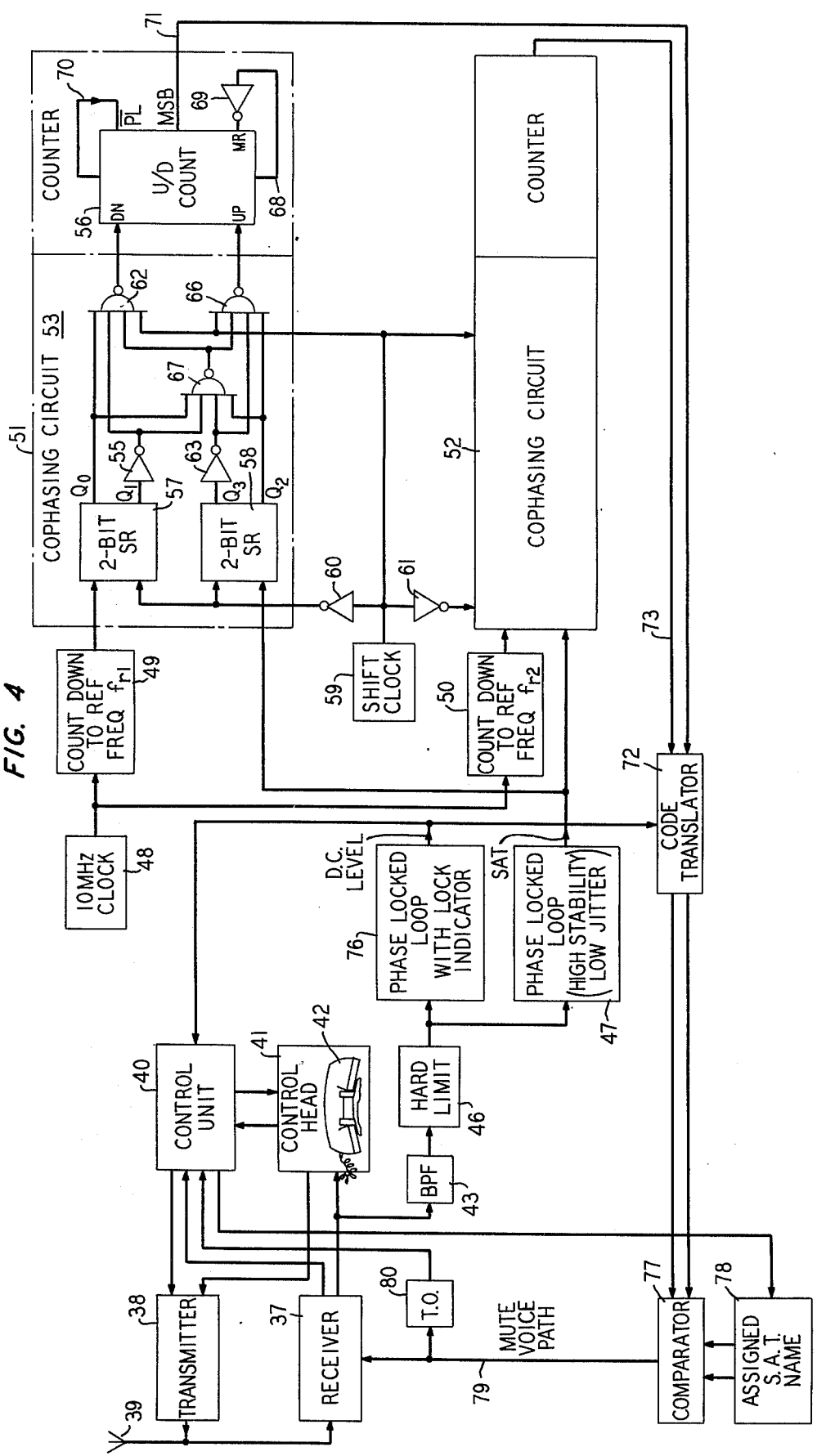
FIG. 4 is a block and line diagram of circuits for a mobile unit to detect and deal with cochannel interference.

FIG. 4 illustrates the relevant parts of a mobile unit circuit for detecting and dealing with cochannel interference at the mobile unit. The circuit mutes the mobile unit receiver during short fades, and it initiates call termination for longer periods of interferences. A different approach is required for detecting improper SAT at the mobile unit than was employed at the base station, since there is no locally generated SAT transmitted from the mobile unit which can be transponded by another station for return to the mobile unit and comparing therein as was done in the base station. Although locally generated SATs could be provided in the mobile unit, they would not be phase locked to each corresponding SAT that might be received. For example, local temperature and other effects at the mobile unit may be different from those at the base station and thus cause the frequencies to differ at least by a frequency $\Delta f$. That difference wold cause a product modulator output to be unstable and would require such output to be integrated over a relatively long interval such as 200 milliseconds. That sort of an interval would be acceptable for determining whether or not to drop a call, but it would be far too long for suppressing short bursts of cochannel interference during, e.g., Rayleigh fades. However, the system considered herein is fast enough for the latter purposes, and it also is sufficiently flexible to facilitate the movement of the mobile unit among any of the cells in the mobile communication area, regardless of the SAT assigned for use by respective base stations in those cells.

In FIG. 4 a receiver 37 and a transmitter 38 are served by an antenna 39. A control unit 40 of any suitable type communicates through the receiver 37 and transmitter 38 with the base station in addition to controlling that receiver and transmitter for various mobile station functions. Such mobile unit receiver, transmitter, and control equipment and functions are known in the art and comprise no part of the present invention. One prior art mobile radiotelephone system including a detailed disclosure of mobile unit elements is shown, for example, in the W. A. Cornell et al. U.S. Pat. No. 3,118,018. One function of the control unit 40 is to receive from a base station a data message directing the mobile unit to tune to a certain channel named in one field of the message, and another field of that message includes the base station SAT name which is then stored in a memory 78 in the mobile unit. In addition, a control head 1 is also coupled to the receiver 37, the transmitter 38, and control unit 40 and includes a subscriber handset 42 to allow the radio telephone subscriber to communicate by humanly perceptible signals through the receiver and transmitter to other fixed and mobile stations in and associated with the overall mobile telecommunication system. Such control head functions are also well known in the art and comprise no part of the present invention.

Audio frequency signals appearing at the discriminator output of receiver 37 are coupled through an active bandpass filter 43 and a hard limiter 46 for deriving signals in the band including the possible SATs with a good signal-to-noise ratio. The hard limiter 46 is advantageously an operational amplifier circuit with high gain and bipolar feedback adapted for limiting positive and negative excursion amplitudes in the SATs. This type of limiting squares up the signal excursions and also cuts out a large part of the noise which might otherwise be present.

A phase-locked loop 47 is characterized by high stability and low jitter. This loop is utilized to select and reproduce at its output the strongest of the SATs provided by the limiter 46 at any one time. One phase-locked loop which is suitable for this purpose is the same type mentioned for loop 22 in FIG. 3.

The output of the phase-locked loop 47 is compared to at least one locally generated reference frequency tone, the number of tones depending upon how many different SATs must be considered. As previously mentioned, only three SATs would typically be required. Of course in some systems of different configuration a mobile unit may need to consider either more or fewer SATs, but the more general case will be herein described. Accordingly, for simplicity of illustration, the circuits of FIG. 4 deal with the case of three SATs; but the manner of extension of that arrangement to the larger or smaller numbers of SATs will become apparent as the description unfolds. For purposes of illustration in the embodiment of FIG. 4 it is assumed that the three SATs are at 5970, 6000, and 6070 Hz. Two reference tones are required for that illustrative arrangement, and these are advantageously chosen at 5988 and 6017 Hz so that they are spectrally located between different adjacent pairs of the SATs. It is, therefore, clear that the reference tones need not be centrally located between SATs. The choice of reference tone in this illustrative embodiment was determined by conveniences in deriving these tones.

In FIG. 4 a clock signal source 48, advantageously operating at 10 MHz for the illustrative embodiment, operates two countdown circuits 49 and 50 for producing the aforementioned reference tones. The circuit 49 counts down the clock signals to a reference frequency $f_{r1}$ of approximately 5988 Hz, and the circuit 50 counts down the clock to the reference frequency $f_{r2}$ of approximately 6016 Hz. The countdown circuits 49 and 50 are advantageously binary counters with overflow output connected to force resetting to an appropriate count level to produce the desired frequency division ratios.

Additional logic is provided in FIG. 4 for indicating the spectral position, with respect to the reference tones, of the SAT supplied from phase-locked loop 47. In this indicating logic, plural digital bit generating circuits 51 and 52 are provided and each generates a different bit of a digital character providing the desired indication of spectral position. Details of only one of the bit generating circuits are shown since both are essentially the same. In the circuit 51 there are provided a cophasing circuit 53 and an up/down counter 56 which is controlled by the two outputs of the cophasing circuit 53.

In cophasing circuit 53 the received SAT and the lower reference frequency $f_{r1}$ are cophased to assure that the forms of those signals, coupled by the circuit 53 to the counter 56, include no coincident signal state transitions as applied to that counter. For this purpose, a pair of 2-bit shift registers 57 and 58 are clocked at at least the Nyquist rate for the SATs; and here the shift clock is advantageously provided by a 1 megahertz clock source 59 through inverters 60 and 61 to the circuits 51 and 52. The shift register 57 receives the reference tone $f_{r1}$ as its data input, and the register 58 receives as its data input the SAT from phase-locked loop 47. Corresponding output connections, but with the second stage (most delayed) output inverted by an inverter 55, of the two stages of shift register 57 are coupled to respective input connections of a NAND gate 62. Similarly, corresponding output connections, but with the second stage output inverted by an inverter 63, are applied to inputs of another NAND gate 66. Those four signals applied to inputs of NAND gates 62 and 66 are also coupled to the four inputs of a further NAND gate 67 which provides a control signal to each of the gates 62 and 66, which are also further enabled by the direct output from shift clock 59.

Thus, gate 67 provides a low disabling input to gates 62 and 66 any time all of its four inputs is in a high logic level state. That happens when the $f_{r1}$ signal is in transition between binary ZERO and ONE signal states, and when two samples of the SAT in register 58 also straddle a transition from the binary ZERO to the binary ONE state. At all other times at least one input to gate 67 is low so it supplies a high enabling output to gates 62 and 66. The latter two NAND gates are thus caused, except when disabled by gate 67, to sample all the ZERO-to-ONE transition state in register 57 for causing up counting in counter 56 and to sample a ZERO-to-ONE transition state in register 58 for causing down counting. The net result of this logic is that pulses at the reference frequency $f_{r1}$ are reproduced at the down-drive input of counter 56, and pulses at the selected SAT are reproduced at the up input, but both inputs are inhibited if the logic detects coincident signal state changes in the shift register data input signals. The cophasing circuit in the circuit 52 produces a similar result with respect to its associated counter and there the SAT is also provided to the up-drive input of the counter, and the reference frequency $f_{r2}$ is applied to the down-drive input.

Counter 56 includes overflow and underflow protection logic which prevents the counter from recycling at either extreme of operation and thus prevents ambiguity in counter output. To this end, logic (not shown) in counter 56 recognizes an all-ONEs condition in the counter and couples a signal through lead 70 to a parallel load input of the counter which is biased to reset the counter to the all-ONEs state in response to each additional up-drive input pulse. Thus, the counter is unable to roll over to the all-ZERO state in response to an input drive that would normally cause it to overflow. Similarly, logic (not shown) in counter 56 detects the all-ZERO state in the counter stages and applies a signal through a lead 68 and an inverter 69 to a master reset input of the counter to reset the counter to the all-ZERO on each additional down-drive input to prevent underflow to the all-ONES state. With this arrangement, counter 56 reaches one extreme or the other of its counting range in a time which is a function of the frequency difference between the frequencies of the signal from gates 62 and 66. Counter 56 and the corresponding counter in bit generating circuit 52 are advantageously the 74193 type counters of the Fairchild Corporation and have four stages each.

An output is provided on a circuit 71 from the most significant bit stage of counter 56 for coupling that output to a code translator 72. A similar output is providing on a lead 73 from the digital bit generating circuit 52. The two bits on leads 71 and 73 indicate by their combined binary signal states the spectral position of the captured SAT with respect to the reference tones. Translator 72 is enabled by a direct current level signal from a phase-locked loop 76. That level signal is produced by the loop 76 whenever the loop locks up on a signal in the output of the hard limiter 46. This level signal is also applied to the control unit 40 to advise that unit that a SAT lockup has been achieved. Translator 72 is advantageously a group of logic gates for performing the indicated translation and many such arrangements are known in the art. The loop 76 is advantageously an XR-2211 FSK demodulator/tone decoder of Exar Integrated Systems, Inc., of Sunnyvale, California.

The enabled translator 72 responds to the digital character provided on leads 71 and 73, and translates the spectral position information represented by that character into another digital character comprising the binary coded representation of the name of the SAT signal provided by the loop 47. By way of illustration, the following table indicates the translations from the spectral position character to the binary coded SAT name for the three SATs illustratively employed for the embodiment of FIG. 4:

| SAT Freq. | Position Character Leads 71, 73 | SAT Name |
|---|---|---|
| 5970 | 0, 0 | 00 |
| 6000 | 1, 0 | 01 |
| 6070 | 1, 1 | 10 |

The SAT name from translator 22 is applied to a comparator 77 which compares that word to the name of the SAT that had been assigned to the mobile unit for the channel on which the unit is working and which name had been stored in a memory 78. If the comparator detects a mismatch between the SAT names from translator 72 and memory 78, it provides a signal on a lead 79 to the receiver 37 for muting the voice signal path from the receiver 37 to control head 41. In addition, the muting signal on lead 47 is coupled through a time-out circuit 80, of the type previously described in connection with FIG. 3, for advising control unit 40 if the mismatch persists for more than a predetermined time interval. In the latter case the control unit causes the transmitter to be turned off thereby initiating a disconnect of the call.

The muted receiver voice path prevents the mobile radiotelephone subscriber from hearing brief intervals of cochannel interference. The time-out function of the circuit 80 enables the control unit 40 to initiate the dropping of the call when SAT mismatch has persisted for a sufficient interval to make it highly likely that supervision has been lost.

Although the present invention has been described in connection with particular embodiments thereof, additional embodiments, modifications, and applications which will be apparent to those skilled in the art are included within the spirit and scope of the invention.

What is claimed is:

1. In a radio communication system in which significant signal reception and demodulation is possible at one station from plural signal sources having the same nominal frequency, but only one of such sources is assigned for communication with such station and each source signal has modulated thereon a unique tone for that source as well as other frequencies, the system being characterized in that there are provided,
    a filter in the station for separating a band of frequencies, including the tones, from substantially all other frequencies in a received and demodulated source signal,
    a circuit for producing at least one reference frequency tone,
    a circuit for producing a digital signal to indicate the relative frequency spectrum positions of the separated tone signal from the filter and of the reference tone, and
    a circuit, responsive to the digital signal, for indicating whether or not the separated tone signal is the correct tone.

2. In a radio communication system,
    means for receiving a plurality of signals having the same nominal frequency and having different tones modulated thereon, only one of said signals being desired for communication with said receving means, said receiving means providing at an output thereof one of said plurality of signals,
    means coupled to said receiving means output for selecting sufficient band of signal frequencies to include all of said tones of the tone signal modulation to produce thereby a selected tone which is the one of said tones modulated on said one of said plurality of signals,
    means for generating at least one reference tone, and
    means, responsive to said selected tone signal in the output of said selecting means and to said reference tone, for producing a digital signal indicating the relative frequency spectral position of the selected tone signal with respect to said reference tone.

3. The radio communication system in accordance with claim 2 in which
    said tones of said signals in said receiving means are spectrally adjacent to one another and spaced apart from each nearest one of said tones by a frequency which is much smaller than the tone frequency, and
    said tone selecting means comprises means for limiting the output of said receiving means to improve the signal-to-noise ratio thereof, and
    phase-locked loop means for coupling the output of said limiting means to said digital signal producing means.

4. The radio communication system in accordance with claim 2 in which
    said generating means includes means for fixing each of said at least one reference tone at a frequency which is not harmonically related to said nominal frequency, and
    said digital signal producing means comprises
        means for generating a signal having a magnitude that is a function of the frequency difference between said tone signal from said selecting means and said reference tone, and
        means for producing a first or a second digital signal state in response to said magnitude being greater or less than a predetermined threshold magnitude, respectively.

5. The radio communication system in accordance with claim 2 which comprises
    means responsive to an output of said receiving means for producing human-perceptible signals corresponding to other information modulated on said plurality of signals and
    means are provided for determining whether or not said selected tone is the tone of said desired communication signal, said determining means comprising
        each of said different tones having a predetermined frequency spectral position in relation to at least one reference tone,
        means for storing a digital signal naming the tone modulated on said signal which is desired for communication with said receiving means,
        means for translating said relative position digital signal into a digital signal naming the one of said different tones having approximately the same spectral position,
        means for comparing said relative position digital signal and said storing means digital signal, and
        means responsive to a mismatch indication from said comparing means for inhibiting said receiving means output to said human-perceptible signal producing means.

6. The radio communication system in accordance with claim 5 which further comprises
    means for timing the duration of said mismatch indication, and
    means for indicating when said mismatch indication persists for an interval in excess of a predetermined time.

7. The radio communication system in accordance with claim 2 in which said digital signal producing means comprises at least one set of
    a cophasing circuit responsive to said selected tone signal and to one of said reference tones for generating respective pulse trains at approximately the frequencies of such tones and without coincident pulses,
    means for reversibly counting pulses, said counting means having an input responsive to said pulse train at the frequency of said selected tone signal from said cophasing circuit for causing said counting means to count in a first direction and having an input responsive to said pulse train at the frequency of said reference tone from said cophasing circuit for causing said counting means to count in a second direction, and means for coupling the most significant bit output of said counting means to an output of said producing means as said digital signal.

8. The radio communication system in accordance with claim 7 in which said cophasing circuit comprises first and second multibit shift registers clocked at a shift rate which is much higher than any of said tones, means for coupling said reference tone and said selected tone signal to data inputs of different ones of said shift registers, means for coupling plural outputs of one of said shift registers to said counter first direction input, means for coupling plural outputs of the other of said shift registers to the second direction input of said counting means, and means responsive to all of said shift register outputs for inhibiting both of said coupling means in response to operation of said shift registers so as to indicate the occurrence of a simultaneous signal state transition in the tones applied to such shift registers.

9. The radio communication system in accordance with claim 7 in which there are at least three different ones of said modulated tones selectable by said selecting means, there are at least two of said reference tones each spectrally located between different adjacent pairs of the three modulated tones, and in which said digital signal producing means comprises a further set of said cophasing circuit, said reversible counting means, and said most significant bit coupling means.

10. The radio communication system in accordance with claim 9 which comprises in addition means for translating the digital signal represented by the most significant bit outputs of said counting means of all of said sets into a binary coded digital character which is the binary coded name of the selected tone.

11. A radio communication system of the cellular type wherein plural cell sets are assigned the same set of communication frequency channels and the cell-channel assignment pattern in each set is such that cells with the same channel assignments are at least a predetermined minimum distance apart so that interference-limited radio communication can be effected between a base station of any one of said cells and mobile radio stations in such cell, each of said cells which is within a potential interference range of another cell, and utilizing the same channel assignment, is assigned a tone which is different from a correspondingly assigned tone of said another cell and which is provided for modulation on its channel carrier frequencies by its base station, and said system comprises in each base station and each mobile station,
means for selecting said assigned tones received at such station on a predetermined channel, and
means for evaluating the correctness of the selected tone with respect to the tone assigned for the station by comparing the selected tone to at least one reference tone, said evaluating means comprises in a base station,
means for comparing the assigned tone provided in the base station for modulation, as the reference, to the selected tone, and means for indicating whether or not there is a frequency difference in excess of a predetermined threshold between such tones, and said evaluating means comprises in a mobile unit
means for generating at least one reference tone which is different from any of said assigned tones, and means for indicating the relative frequency spectrum positions of the last-mentioned reference and selected tones.

12. In a radio communication system in which signal reception is possible at one station from plural signal sources having the same nominal frequency but only one of such sources is assigned for communication with such station and each such source signal has modulated thereon a unique tone for that source as well as other frequencies, a method for verifying reception of said one source signal comprising the steps of separating a band of frequencies, including the tones, from substantially all other frequencies in a received source signal, producing at least one reference frequency tone, producing a digital signal to indicate the relative frequency spectrum positions of a dominant one of the separated tones and of the reference tone, and determining in response to said digital signal whether or not the dominant tone is the correct tone.

* * * * *